(12) United States Patent  (10) Patent No.: US 9,004,130 B2
Martinez  (45) Date of Patent: Apr. 14, 2015

(54) MANUAL AND AUTOMATIC HEAT WELDING GUN

(71) Applicant: Leo Martinez, Buena Park, CA (US)

(72) Inventor: Leo Martinez, Buena Park, CA (US)

( * ) Notice: Subject to any disclaimer, the term of this patent is extended or adjusted under 35 U.S.C. 154(b) by 205 days.

(21) Appl. No.: 13/694,926

(22) Filed: Jan. 18, 2013

(65) Prior Publication Data

US 2014/0202639 A1  Jul. 24, 2014

(51) Int. Cl.
*B32B 37/00*  (2006.01)
*B29C 65/42*  (2006.01)
*B29C 65/00*  (2006.01)
*E04F 21/22*  (2006.01)
*B29L 31/00*  (2006.01)
*B29C 65/12*  (2006.01)

(52) U.S. Cl.
CPC ............ *B29C 65/42* (2013.01); *B29C 66/1142* (2013.01); *B29C 66/43* (2013.01); *B29C 66/836* (2013.01); *B29C 66/8652* (2013.01); *B29C 66/86521* (2013.01); *B29C 66/86535* (2013.01); *E04F 21/22* (2013.01); *B29C 66/7482* (2013.01); *B29L 2031/732* (2013.01); *B29C 65/12* (2013.01); *B29C 66/02241* (2013.01); *B29C 66/1224* (2013.01); *B29C 66/1228* (2013.01); *B29C 66/435* (2013.01)

(58) Field of Classification Search
USPC .................. 156/367, 368, 499, 500, 574, 579
See application file for complete search history.

(56) References Cited

U.S. PATENT DOCUMENTS

| 5,656,126 | A | 8/1997 | Martinez |
| 6,640,446 | B2 | 11/2003 | Martinez |
| 7,686,055 | B2 * | 3/2010 | Gisler et al. ................ 156/574 |

OTHER PUBLICATIONS

Turbo Heat Welding Tools Catalog, #22 Turbo Caddy (Automatic Welder), p. 6, Jun. 2012.
Sinclair Catalog, Automatic Welding Machine #43-771, p. 8, Jul. 2006.
Janser Katalog 107, Schweissautomat Leister Unifloor, p. 53, Jul. 2008.
Zinser Catalog (Internet), Zinser Floor Welding Machine K58, p. 2, May 2010.
Profloor Main Catalog, 61455 00 Automatic Welder Unifloor E, p. 2.41, 2006.
Winkleman Sales Inc. Catalog, Leister Automatic Floor Welding WDD 710, p. 9.
Leister promotional leaflet SBB, Universal, p. 2 and TRIAC-S hand welding tool with speed welding nozzle, p. 3, Oct. 2001.
Forsthoff Tools Catalog, FORPLAST-F Automatic Welder for Flooring, p. 11, 2012.

* cited by examiner

*Primary Examiner* — James Sells
(74) *Attorney, Agent, or Firm* — Charles H. Thomas (57) ABSTRACT

A portable, handheld, light-weight device for sealing seams between adjacent sheets of flooring in which a seam following guide is incorporated as an inseparable part of the body of the handheld device. The guide has a pair of laterally separated rollers carried by a roller mounting that has a narrow, seam following element located midway between the rollers. A support on the body may be extended to hold a sealant dispensing tip out of contact with the adjacent sheets of flooring, or collapsed to allow the tip to contact the adjacent sheets of flooring that are to be sealed together with sealant therebetween. An electrically powered propulsion system drives the rollers and is operable to automatically advance the device along a seam as sealant is discharged into it. Alternatively, the device can be manipulated manually with the propulsion system disabled for use in detail work.

16 Claims, 7 Drawing Sheets

MANUAL AND AUTOMATIC HEAT WELDING GUN

BACKGROUND OF THE INVENTION

1. Field of the Invention

The present intention relates to a portable, handheld, lightweight device used for sealing seams between adjacent sheets of flooring.

2. Description of the Prior Art

In laying flooring that is sold commercially in sheets, such as linoleum flooring, adjacent sheets of flooring are positioned side-by-side and cut to the desired shape. In the past, the flooring sheets have been secured to the floor by adhesive compound. To secure the flooring sheets the compound is applied to the floor and the cut sheets of flooring are laid in position, adjoining each other, one by one. Once each sheet of flooring is laid, the next adjacent flooring sheet is brought into position and pressed against the floor with the linear edges of adjacent flooring sheets residing in mutual, abutment.

One problem with laying sheets of flooring in this manner is that with age, use, movement of the subfloor, or improper installation, the adhesive bonding the flooring to the subfloor fails. As a result, flooring sheets separate from the subfloor. The separation of areas of flooring sheets from the subfloor is particularly pronounced at the interfaces between adjacent sheets of flooring. When this occurs, the edges of the adjoining sheets of flooring rise, allowing moisture, dirt and debris to find their way into the seams between the flooring sheets.

To prevent this problem a variety of devices have been produced to discharge sealant into the seams between adjoining sheets of flooring. Some of these devices are quite large, bulky, difficult to maneuver and very expensive. Other handheld, portable seam sealing devices have been devised that are much easier to manipulate and far less costly. One such device is described in U.S. Pat. No. 5,656,126, incorporated by reference herein in its entirety.

One primary difficulty with handheld, portable seam sealing implements is that they must be held and controlled in a precise position of alignment relative to the adjoining sheets of flooring to be sealed. This requires considerable skill on the part of the flooring installer. To aid the installer in holding the handheld, portable seam sealing implement in the proper position, detachable stabilizing guides have been provided for attachment to the handheld, seam welding implement. One such guide is described in U.S. Pat. No. 5,656,126. This guide has been used successfully for many years. This stabilizing guide supports a handheld welding gun by means of a stabilizing carriage and an adapter for removably securing the welding gun to the carriage. The stabilizing carriage has a pair of laterally separated rollers disposed on opposite sides of the welding gun, and a track follower centered beneath the welding gun to follow the linear seam between the adjoining sheets of flooring. The carriage, together with the adapter, hold the seam welding gun in the proper position of equilibrium, providing lateral support as well as guiding the movement of the handheld seam sealing gun as the flooring installer moves it along the seam between the adjacent sheets of flooring.

Carriage accessories have been refined through the years, but still require a separate carriage support into which a conventional welding gun is seated. One carriage accessory that is now utilized with success is currently sold as the TURBO® Caddy (automatic welder) by Turbo Heat Welding Tools at www.turboheatweldingtools.com. This device provides the user not only with support for the heat welding gun, but also with an automated, adjustable speed control that propels the carriage along with the seam sealing gun detachably mounted on it. The carriage is driven at a uniform speed set by the operator so that the heated sealant flows into the seam between adjoining sheets of flooring at a uniform rate and temperature.

One problem that exists with this device, however, is that it is still too bulky and unwieldy for handheld manipulation to discharge sealant into curved coving seams and other tight places. The carriage weighs about 16 pounds, so that with the heat welding gun mounted on it, the carriage mounted gun still cannot be easily manipulated by an operator using only one hand. To the contrary, the operator must take the time to detach the welding gun from the caddy and use the welding gun by itself to weld seams at curved covings and to weld short sections of seams between vertical obstructions, such as cabinets.

SUMMARY OF THE INVENTION

The present intention provides a device for sealing seams between adjoining sheets of flooring in which a guide having the advantages of the TURBO® Caddy (automatic welder) is incorporated as a unitary structure with the body of the portable, handheld seam sealing welding gun itself. The entire structure of the seam welding gun weighs less than 10 pounds, so it can easily be manipulated by an operator using only one hand on curved covings and in tight spaces. That is, the device has the advantages of being used both as a portable, handheld operated device, and also alternatively, as an automatic, self-propelled seam welder that can be set to travel automatically along longer, linear, seams between flat sheets of adjacent flooring.

In one broad aspect the present invention may be considered to be a device for sealing seams between adjoining sheets of flooring The device is comprised of a portable, handheld seam sealing welding gun weighing more than about 10 pounds and having a body defining a longitudinal axis and having a heating element end an opposite electrical power supply end. The device also includes a sealant extruding nozzle mounted on the heating element end of the body, a roller mount having opposing ends and permanently formed into the opposite end of the body and located beneath the longitudinal axis the roller mount defines an axis of roller rotation. A narrow, seam following element is also provided and is oriented perpendicular to the axis of roller rotation. The seam following element and the longitudinal axis together define an upright plane perpendicular to the adjoining sheets of flooring and wherein the axis of roller rotation is oriented perpendicular to the upright plane. The device further includes a pair of rollers mounted on the opposing ends of the roller mount and laterally spaced equidistant from the upright plane. The rollers are coupled to the roller mount for rotation about the axis of roller rotation.

Preferably, the device also includes a heating element support joined to the heating element end of the body and deployable to an erected position for holding the sealant extruding nozzle out of contact with the adjoining sheets of flooring. The heating element support is collapsible to a collapsed position allowing the sealant extruding nozzle to reside in sliding contact with the adjoining sheets of flooring. Preferably the heating element support is a rigid leg hinged to the body of the seam sealing gun.

Preferably the device of the invention also includes an electrically driven propulsion system for driving the rollers in rotation to travel along the adjoining sheets of flooring in a direction away from the sealant extruding nozzle. A speed control is preferably provided to allow adjustment of the speed of roller rotation.

The portable device is quite lightweight. Although it can weigh up to about 10 pounds, preferably in weighs no more than seven pounds and can be made small and compact enough so that the seam sealing welding gun weighs only about three pounds.

In another broad aspect the invention may be considered to be a device for sealing seams between adjoining sheets of flooring comprising a portable, handheld seam sealing welding gun weighing no more than about 10 pounds, a sealant dispensing tip, a roller mounting structure, a seam follower and a pair of rollers. The seam sealing welding gun is small enough to be lifted and manipulated for operation with only one hand. It has a body defining a longitudinal axis of welding gun alignment. The body has a front heating element end and an opposite rear operator gripping end. The sealant dispensing tip is mounted on the front heat welding end of the body. The roller mounting structure has opposing ends and is formed as an inseparable part of the rear operator gripping end of the welding gun body. The roller mounting structure defines an axis of roller rotation. A seam follower is oriented perpendicular to the axis of roller rotation. The seam follower together with the longitudinal axis of welding gun alignment define a welding gun equilibrium plane that is perpendicular to the adjoining sheets of flooring when the welding gun is operated to dispense sealant between the adjoining sheets of flooring. Rollers are mounted on the opposing ends of the roller mounting structure equidistant from the welding gun equilibrium plane. The rollers are disposed on the roller mounting structure for rotation about the axis of roller rotation.

In still another broad aspect the invention may be considered to be a device for discharging sealant to seal adjacent sheets of flooring together in a seam therebetween. The device is comprised of a handheld seam welding implement, a sealant dispensing tip, a roller support structure, a thin, seam following element, and a pair of rollers. The seam welding implement weighs no more than about 10 pounds and has an elongated body defining an axis of welding implement alignment. The elongated body has a first heating end and a second, opposite power supply end. The sealant dispensing tip is mounted on the first heating end of the body. The roller support structure is formed as an inseparable portion of the power supply end of the body. The roller support structure has mutually opposing extremities and defines a transverse axis of rotation extending between the mutually opposing extremities. The thin, seam following element depends from the roller support structure. It fits into the seam and is oriented perpendicular to the axis of rotation. The seam following element and the axis of welding implement alignment together define a welding implement plane of operation perpendicular to the sheets of flooring when the welding implement is operated to discharge sealant into the seam. The pair of rollers is carried by the roller support structure and the rollers are located on opposite sides of the welding implement plane of operation from the seam following element.

The invention may be described with greater clarity and particularity by reference to the accompanying drawings.

DESCRIPTION OF THE EMBODIMENT

Figure 1:
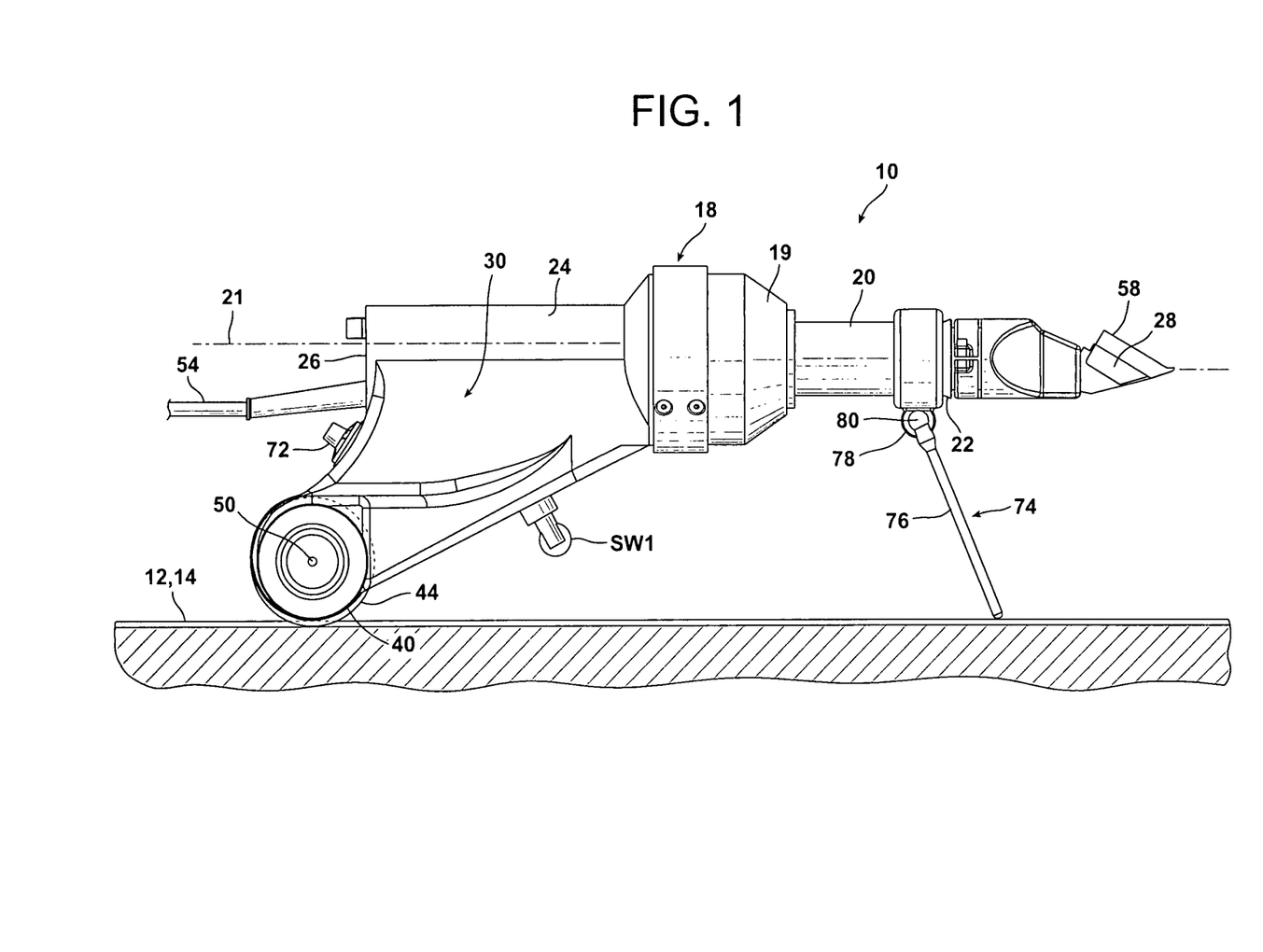
FIG. 1 is a side elevational view of the device for sealing seams according to the invention shown with the heating element support deployed in an erected position for holding the sealant extruding nozzle out of contact with the adjoining sheets of flooring.
Figure 3:
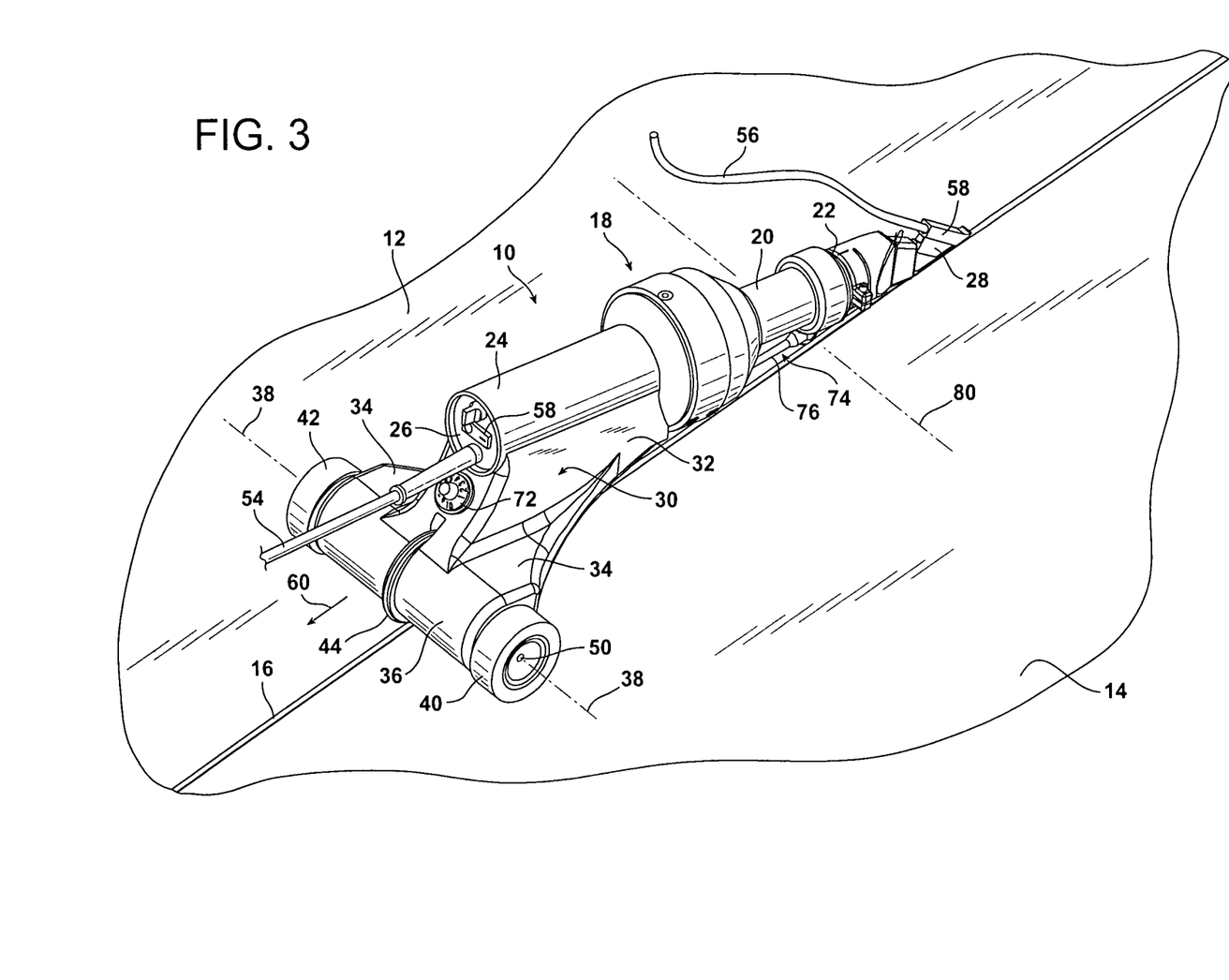
FIG. 3 is an oblique, perspective view of the device, shown from the rear with the heating element support in its collapsed position.
Figure 4:
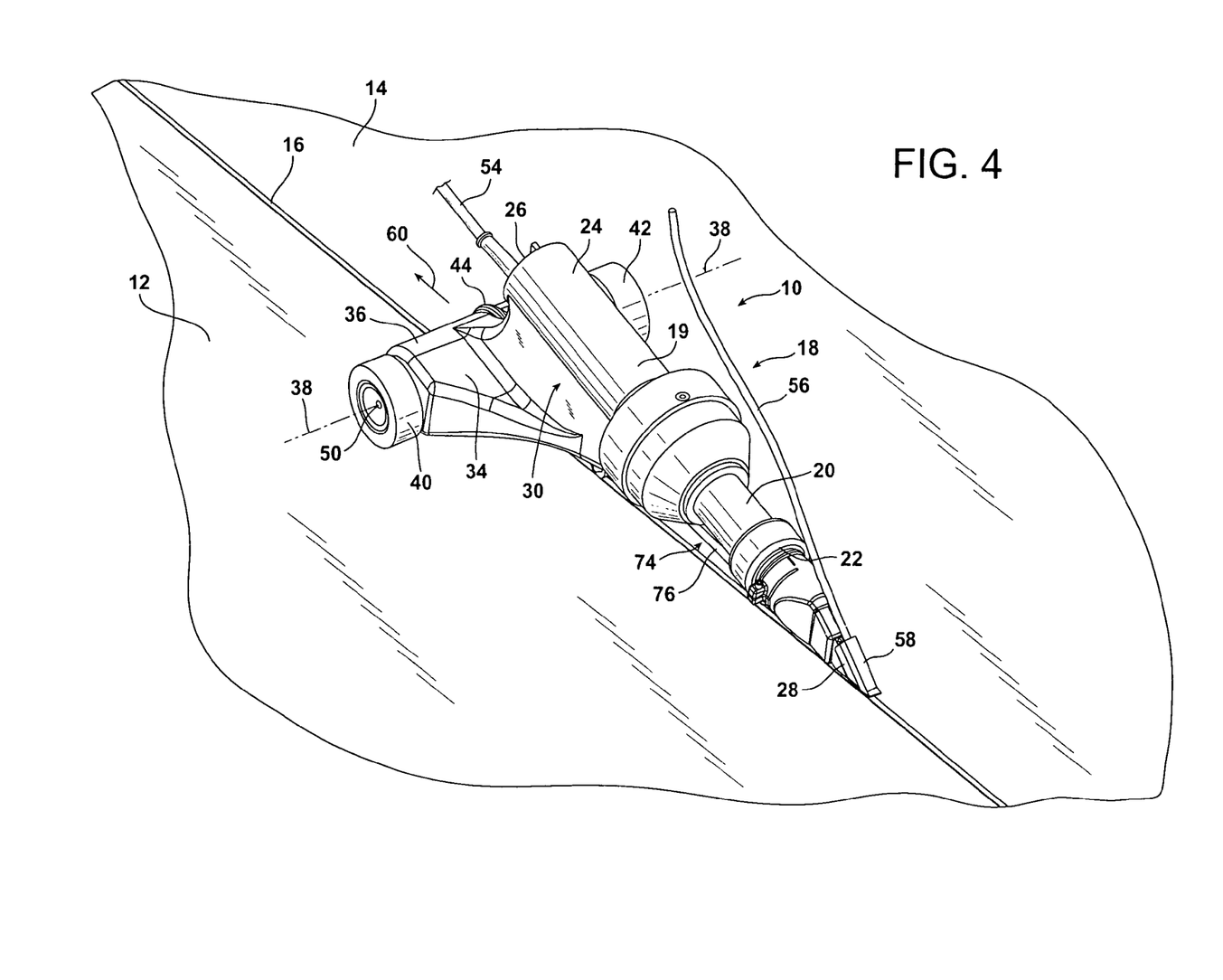
FIG. 4 is an oblique, perspective view of the device, shown from the front with the heating element support in its collapsed position.
Figure 5:
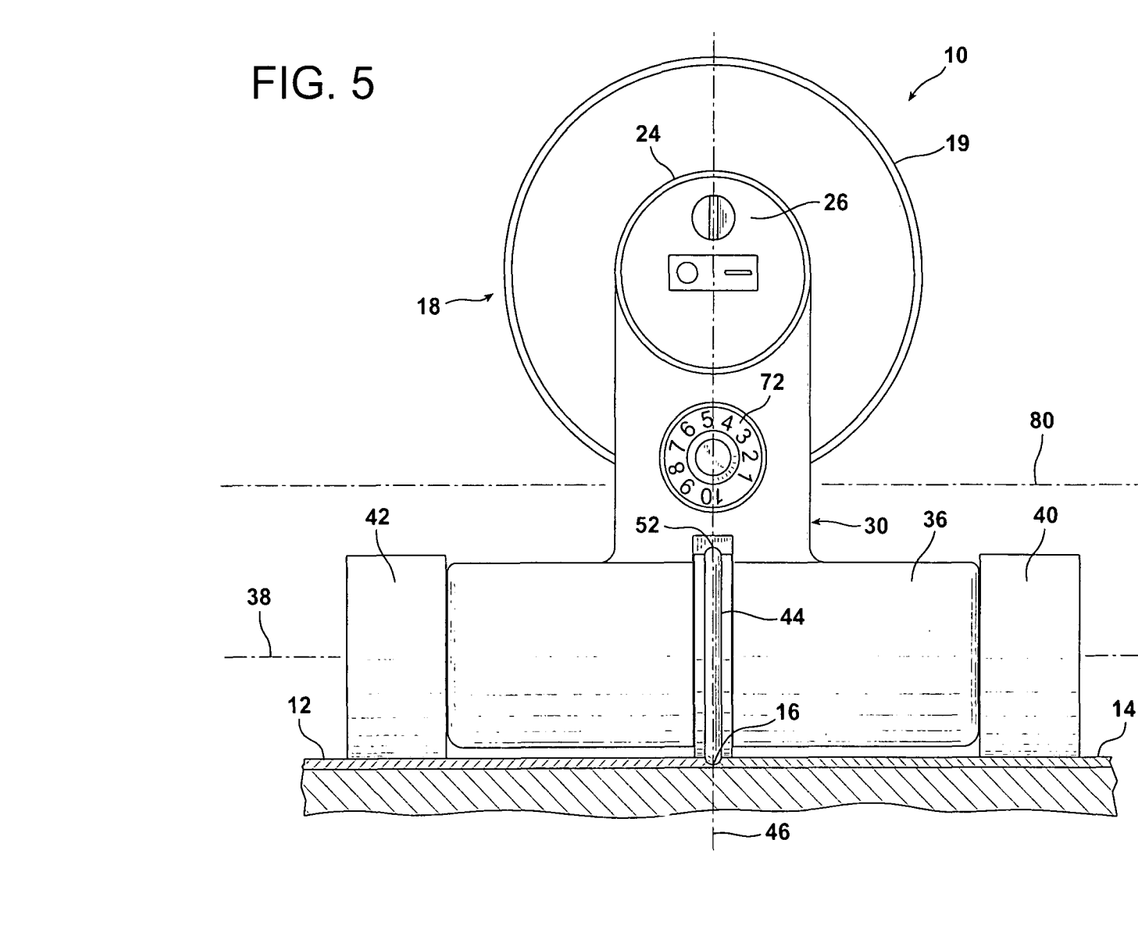
FIG. 5 is a rear elevational view of the device of the invention.

FIG. 1 illustrates a device 10 for sealing seams between adjoining sheets of flooring 12 and 14, shown in FIGS. 3, 4 and 5. As illustrated in those drawing figures, the sheets of flooring 12 and 14 are flat and lie adjacent to each other with their edges in mutual abutment and with a seam 16 delineated therebetween. Preferably the seam 16 has been grooved with a grooving tool, such as that described in U.S. Pat. No. 6,640,446, incorporated by reference herein in its entirety.

The device 10 is comprised of a portable, handheld seam sealing welding gun 18, which is a modification of a commercially available Leister Triac "S" 120 volt, 1600 watts heat welding gun. Like the commercially available Leister Triac heat welding gun, the improved welding gun of the invention has a body 19 with a heating element 20 at its front, heating element end 22 and a power supply 24 at its opposite, rear electrical power supply and operator gripping end 26. The body 19 is elongated and defines a longitudinal axis 21 that is centered within the cylindrical portion of the body 19. The longitudinal axis 21 is an axis of welding implement alignment.

The portable, handheld seam welding gun 18 must weigh no more than about 10 pounds and is small enough so that it may be lifted and manipulated for operation by an operator using only one hand. Preferably, the seam sealing welding gun 18 weighs no more than about seven pounds. In the embodiment of the invention illustrated, the seam sealing welding gun 18 weighs only about three pounds.

A sealant extruding nozzle 28 is mounted on the front, heating element end 22 of the body 19. The nozzle 28 serves as a sealant dispensing tip and may be of the type described in U.S. Pat. No. 7,571,751 and sold commercially as the Turbo® Precision Nozzle by Turbo Heat Welding Tools.

The seam sealing welding gun body 19 is provided with a roller mount or mounting 30 at its rear, opposing power supply and operator gripping end 26. The roller mounting 30 is a roller support structure incorporated and permanently formed and built into the structure of the body 19. The roller mounting 30 is an inseparable portion of the power supply and 24 of the body 19 and forms a major element of novelty of the present invention.

Figure 6:
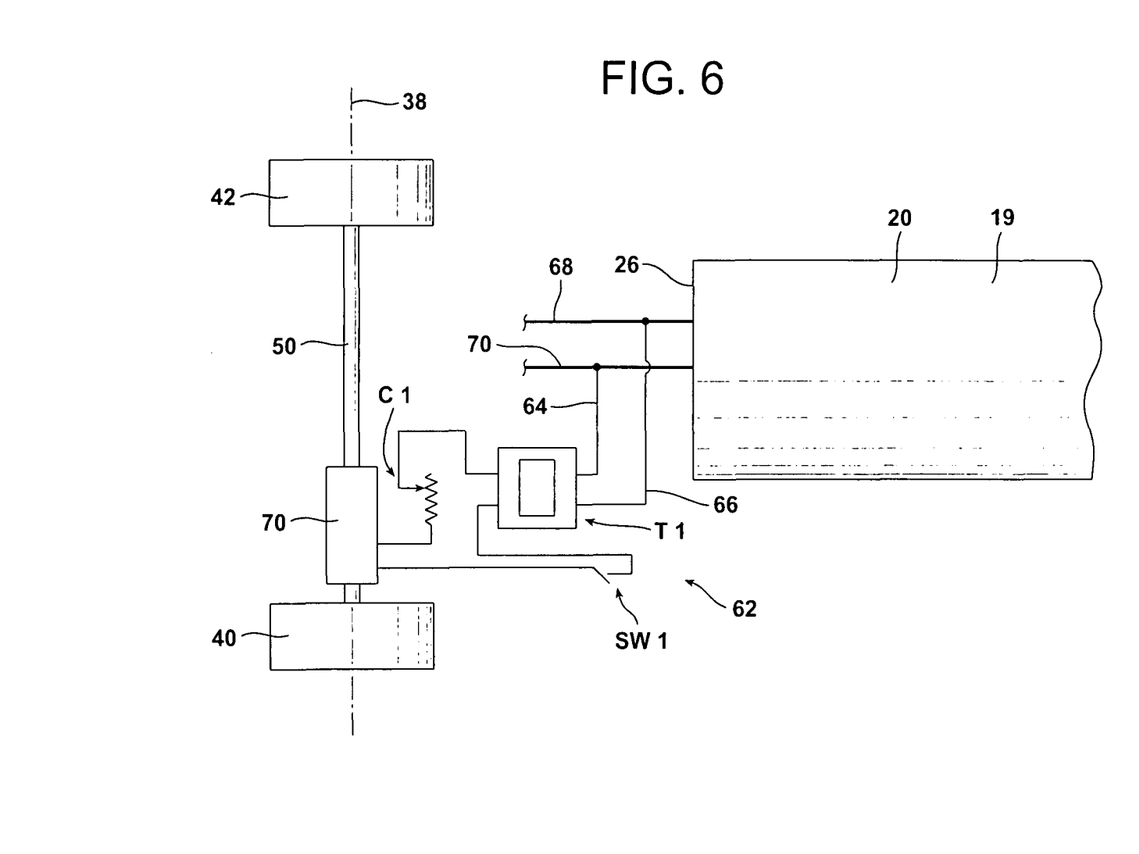
FIG. 6 is a top, electrical schematic view of the device of the invention

As shown, for example, in FIG. 3 of the drawings, the roller mounting 30 is constructed with a depending, generally box shaped, electronic component enclosure 32 which is hollow so as to enclose the electronic components illustrated in FIG. 6. The roller mounting 30 also includes a pair of laterally and rearwardly projecting wings or flanges 34. The flanges 34 terminate in a hollow, generally cylindrical, transversely oriented roller support 36. The cylindrical roller support 36 of the roller mounting 30 is hollow at its center and defines an axis of roller rotation 38 upon which are mounted a pair of rollers 40 and 42 and also a narrow, seam following element 44. The seam following element 44 functions as a seam follower and is oriented perpendicular to the axis of roller rotation 38. The seam following element 44 and the longitudinal axis 21 of the welding gun body 19 together define an upright plane 46, indicated in FIG. 5. The upright plane 46 is an equilibrium plane and welding implement plane of operation for the welding gun 18. The upright plane 46 is perpendicular to the adjoining sheets of flooring 12 and 14. The axis of roller rotation 38 is oriented perpendicular to the upright, equilibrium plane of operation 46 as illustrated in FIG. 5.

A pair of rollers 40 and 42 are mounted on the opposing ends of an axle 50 which is located at the center and rotatable within the roller support and mounting 36. The rollers 40 and 42 are keyed or otherwise secured to rotate with the axle 50.

The narrow, seam following element 44 is shaped as a thin disk shaped wheel, narrowed at its periphery to form a ring shaped track following rim 52 configured to fit into the grooved seam 16. The wheel track following rim 52 fits into and rides in the seam 16. The seam following element 44 is also keyed or otherwise secured to the axle 50 so that it turns in rotation with the axle 50.

As with conventional welding guns, the welding gun 18 receives electrical power through a power cord 54 that is connected to the power supply end 26 of the welding gun body 19. Electrical power is supplied through the power cord 54 that is converted to heat in heating coils located within the heating element end 22 of the welding gun 18 in a conventional manner. A thermoplastic rod 56 of adhesive is inserted into a welding rod receiving tube 58 that forms a part of the sealant dispensing tip 28. The thermoplastic welding rod 56 may be fed in elongated sticks or from a roll in a conventional manner.

To operate the device 10 for discharging sealant to seal adjacent sheets of flooring 12 and 14, the power control switch 58 is turned to the "ON" to cause the heating element 20 within the first heating element end 22 of the seam welding implement or gun 18 to heat up and then melt the portion of the welding rod 56 residing in the sealant extruding nozzle 28. As the thermoplastic of the welding rod 56 melts, it flows into the seam 16, thereby creating a firm, watertight bond between the abutting edges of the flooring sheets 12 and 14. The operator, gripping the welding gun 18 by the power supply end 26 of the welding gun body 19, guides the device 10 in the rearward direction indicated by the directional arrow 60 in FIGS. 2 and 3. The direction 60 is the direction away from the sealant dispensing tip 28. The operator guides the device 10 for sealing seams in a rearward direction 60 along the entire length of the seam 16. As the device 10 moves rearwardly, sealant from the melting welding rod 56 flows into the seam 16, as the sealant dispensing tip 28 travels the length of the seam 16.

A further feature of the invention is the provision of an electrically driven propulsion system 62, shown schematically in FIG. 6. The propulsion system 62 drives the rollers 40 and 42 in rotation in a counterclockwise direction, as viewed in FIG. 2. This causes the rollers 40 and 42 to travel along the adjoining sheets 12 and 14 of flooring in the direction 60, which is the direction away from the sealant extruding nozzle 28.

The propulsion system 62 is comprised of a pair of electrical tap lines 64 and 66 connected in parallel with the heating element 20 from the power lines 68 and 70 located within the electrical power cord 54. The electrical tap lines 64 and 66 are connected to a small transformer T1 that is used to power an electric motor 70. The drive shaft of the motor 70 is coupled by conventional gearing to drive the axle 50 in rotation so that the rollers 40 and 42 pull the device 10 for sealing seams in the flooring sheets 12 and 14 in the direction 60.

The device 10 is further comprised of a speed control C1, which is simply a rheostat, that is, a variable resistor. The wiper arm of the variable resistor in the speed control C1 is moved along the resistance element simply by turning the dial 72 mounted in the rear, power control end 26 of the seam sealing gun body 19. The movement of the wiper arm in the variable resistor of the speed control C1 varies the electrical current supplied to the motor 70 to increase or decrease the speed of rotation of the shaft of the motor 70. This increases or decreases the speed of rotation of the roller axle 50 and thereby also the speed of rotation of the rollers 40 and 42. The operator can thereby adjust and regulate the speed of travel of the device 10 on the sheets of flooring 12 and 14 so that the device 10 will travel automatically along the length of the seam 16. Preferably the speed control C1 can be adjusted to vary the linear speed to travel of the welding gun 19 between 2 and 12 feet per minute.

Figure 2:
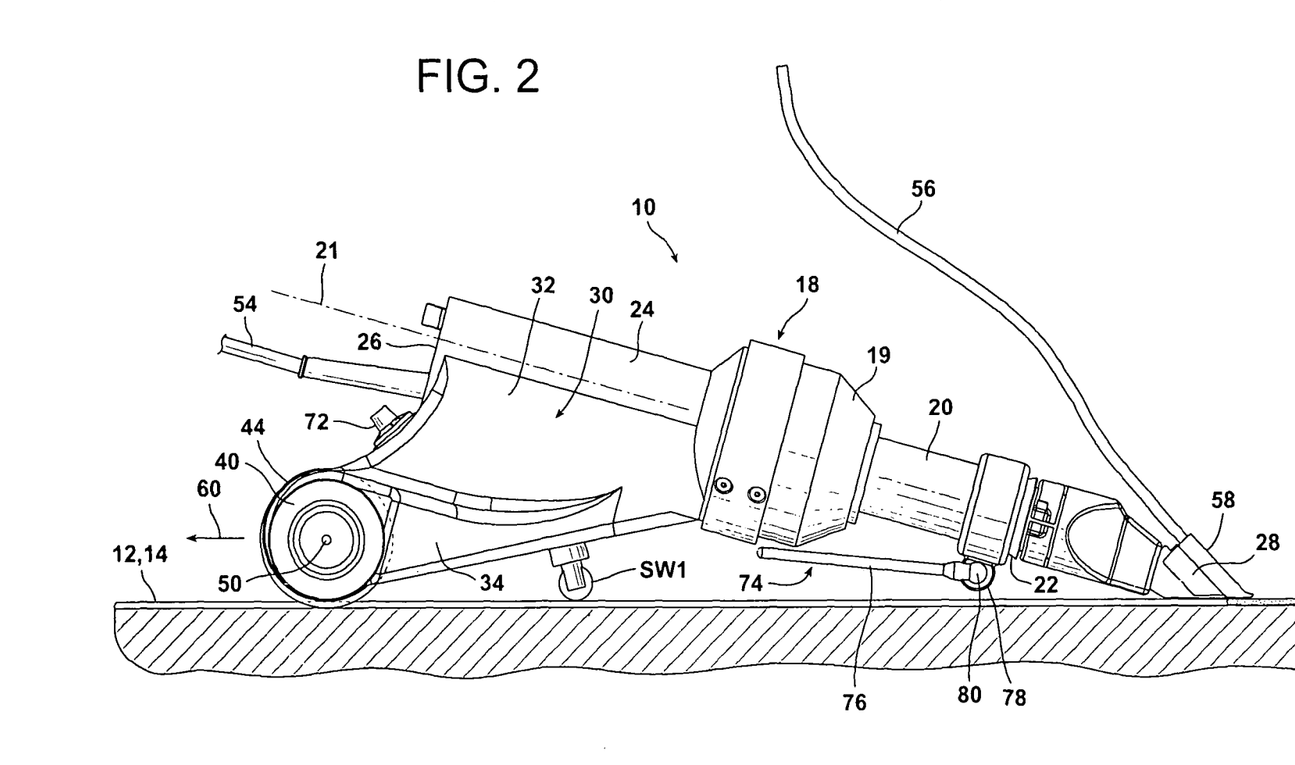
FIG. 2 is a side elevational view of the device for sealing seams according to the invention shown with the heating element support deployed in a collapsed position allowing the sealant extruding nozzle to reside in sliding contact with the adjoining sheets of flooring.

The seam sealing device 10 also is comprised of a heating element support 74 joined to the heating element end 22 of the body 19. The heating element support 74 includes a rigid leg 76 that is coupled to the front end 22 of the body 19 by a hinge connection 78. The rigid leg 76 rotates relative to the body 19 about a support axis 80 that is perpendicular to the upright plane 46. The heating element support 74 is deployable to an erected position illustrated in FIG. 1 for holding the sealant extruding nozzle 28 out of contact with the adjoining sheets of flooring 12 and 14. Alternatively, the heating element support 74 is collapsible to a collapsed position, as illustrated in FIG. 2. Collapsing the heating element support 74 allows the sealant extruding nozzle 28 to reside in sliding contact with the adjoining sheets of flooring 12 and 14. The seam sealing device 10 is also provided with an electrical kill switch SW1 that disables the propulsion system 62 unless the leg 76 is in the collapsed position shown in FIG. 2.

The seam sealing device 10 may be utilized as either a manual or automatic seam sealing device. FIGS. 1-5 illustrate its use as an automatic seam sealing device. When used in this manner, the operator initially sets up the device 10 as illustrated in FIG. 1 with the seam following element 44 centered in the seam 16 and with the sealant extruding nozzle 28 located directly above the location at which sealant is to be first discharged into the seam 16. In this initial setup position the heating element support 74 is in the deployed, erected position so that the electrical contacts in the kill switch SW1 are open, as illustrated in FIG. 6. A speed of travel is set as desired by the operator by rotating the dial 72 to the appropriate speed selection. The power switch 58 is then turned on until the heating element 20 within the heating element end 22 creates enough heat to melt the portion of the plastic welding rod 56 within the welding tip 28. At this point no power is yet supplied to the propulsion system 62.

Once the operator is satisfied with the location of the seam sealing device 10 and the viscosity of the melting sealant from the welding rod 56, the operator tilts the heating element end 22 of the welding gun body 19 upwardly slightly in a counterclockwise direction from the position of FIG. 1. The operator then swings the leg 76 rearwardly in a clockwise direction, folding it up against the underside of the body 19. The operator then lowers the heating element end 22 until the nozzle 28 resides in contact with the sheets of flooring 12 and 14. When the heating element end 22 is lowered to this position, shown in FIG. 2, the electrical contacts in the kill switch SW1 are closed, thereby enabling and operating the propulsion system 62.

The drive shaft of the motor 70 is engaged with the axle 50 and turns the rollers 40 and 42 to drive the seam sealing device 10 linearly in the rear direction 60. The seam sealing device 10 thereupon travels in the direction 60, discharging sealant from the sealant extruding nozzle 28 into the seam 16, thereby creating a firm bond between the abutting edges of the sheets of flooring 12 and 14. The propulsion system 62 of the seam sealing device 10 advances the entire seam sealing device 10 rearwardly in the direction 60, along the line of the seam 16 until the sheets of flooring 12 and 14 are sealed together along their entire lengths.

When operated in the automatic mode in this manner, very little skill is required to seal long linear seams 16. The laterally separated rollers 40 and 42, acting through the support wings or flanges 34 maintain the heat welding gun 19 in a proper, upright orientation so that the longitudinal axis 21 is held precisely in the vertical upright plane 46 that is perpendicular to the sheets of flooring 12 and 14. The propulsion system 62 drives the seam sealing gun 18 rearwardly in the direction 60 at a uniform speed so that the amount of sealant discharged from the sealant extruding nozzle 28 does not vary along the length of the seam 16. The track following rim 52 of the seam following disk 44 extends into the seam 16 and below the flat, upper surfaces of the sheets of flooring 12 and 14 so that the seam sealing gun 18 cannot shift laterally and remains centered directly above the seam 16. The seam sealing device 10 can thereby be used to seal long seams between adjoining sheets of flooring 12 and 14.

Figure 7:
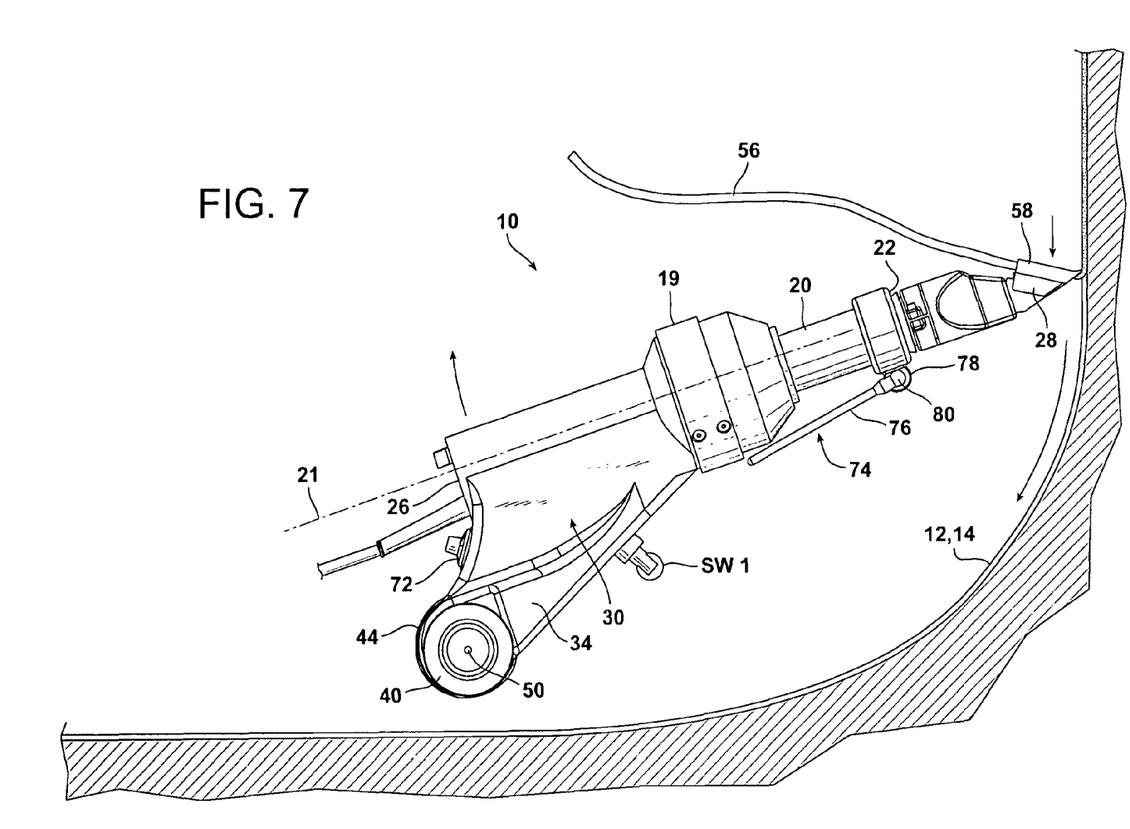
FIG. 7 is a side elevational view illustrating the use of the device of the invention for discharging sealant into a coving seam between curved, adjoining sheets of the flooring.

There are occasions when manual use of the seam sealing device is preferred. For example, to seal very short seams 16 or to seal seams in coving or other detail work, automated operation of the seam sealing device 10 is inappropriate. For example, as illustrated in FIG. 7, the seam sealing device 10 may be manipulated manually by lifting it by the power supply end 26 as shown. The seam welding gun 19 is very light in weight, preferably weighing only about three pounds, so that it can be easily manipulated by the operator using only one hand. When employed in this manner the kill switch SW1 is not depressed, so that the electrical contacts of the kill switch SW1 are open. Consequently, the propulsion system 62 is disabled when the seam sealing device 10 is utilized in a manual mode of operation, as illustrated in FIG. 7.

It can be seen that the seam sealing device 10 requires no attachment to or detachment from any carriage or other roller guide support. To for the contrary, the roller mount 30 together with the pair of rollers 40 and 42 and the seam following element 44 are all permanent parts of the seam sealing welding gun 18.

Undoubtedly, numerous variations and modifications of the invention will become readily apparent to those familiar with sealing seams between sheets of adjoining and abutting flooring. Accordingly, the scope of the invention should not be construed as limited to the specific embodiment depicted and described, but rather is defined in the claims appended hereto.

I claim:

1. A device for sealing seams between adjoining sheets of flooring comprising:
    a portable, handheld seam sealing welding gun weighing no more than about 10 pounds and having a body defining a longitudinal axis and having a heating element end an opposite electrical power supply end,
    a sealant extruding nozzle mounted on said heating element end of said body,
    a roller mount having opposing ends and permanently formed into said opposite end of said body and located beneath said longitudinal axis and defining an axis of roller rotation,
    a narrow, seam following element oriented perpendicular to said axis of roller rotation and, together with said longitudinal axis, defining an upright plane perpendicular to said adjoining sheets of flooring and wherein said axis of roller rotation is oriented perpendicular to said upright plane,
    a pair of rollers mounted on said opposing ends of said roller mount and laterally spaced equidistant from said upright plane and coupled to said roller mount for rotation about said axis of roller rotation,
    an electrically powered propulsion system for driving said rollers in rotation to travel along said adjoining sheets of flooring in a direction away from said sealant extruding nozzle, and
    a switch on said seam sealing welding gun connected to said electrically powered propulsion system for alternatively actuating and deactuating said electrically powered propulsion system.

2. A device for sealing seams according to claim 1 further comprising a speed control for said electrically powered propulsion system to allow adjustment of speed of roller rotation.

3. A device for sealing seams according to claim 2 wherein said seam sealing welding gun weighs about 3 pounds.

4. A device for sealing seams according to claim 1 wherein said seam following element is a thin disk mounted for rotation about said axis of roller rotation.

5. A device for sealing seams according to claim 1 further comprising a heating element support joined to said heating element end of said body and deployable to an erected position for holding said sealant extruding nozzle out of contact with said adjoining sheets of flooring and collapsible to a collapsed position allowing said sealant extruding nozzle to reside in sliding contact said adjoining sheets of flooring.

6. A device for sealing seams according to claim 5 wherein said heating element support is a rigid leg hinged to said body for rotation about a support axis that is perpendicular to said upright plane.

7. A device for sealing seams according to claim 6 wherein said switch is an electrical kill switch to disable said propulsion system unless said leg is in said collapsed position.

8. A device for sealing seams between adjoining sheets of flooring comprising:
    a portable, handheld seam sealing welding gun weighing no more than about 10 pounds and small enough to be lifted and manipulated for operation with only one hand, and having a body defining a longitudinal axis of welding gun alignment and having a front heating element end and an opposite rear operator gripping end,
    a sealant dispensing tip mounted on said front heat welding element end of said body,
    a roller mounting structure having opposing ends wherein said roller mounting structure is formed as an inseparable part of said rear operator gripping end of said welding gun body, and said roller mounting structure defines an axis of roller rotation,
    a seam follower oriented perpendicular to said axis of roller rotation, wherein said seam follower together with said longitudinal axis of welding gun alignment define a welding gun equilibrium plane that is perpendicular to said adjoining sheets of flooring when said welding gun is operated to dispense sealant between said adjoining sheets of flooring, rollers mounted on said opposing ends of said roller mounting structure equidistant from said welding gun equilibrium plane, and said rollers are disposed on said roller mounting structure for rotation about said axis of roller rotation, an electrically driven propulsion system with an adjustable speed switch for driving said rollers in rotation to travel along said adjoining sheets of flooring in a direction away from said sealant dispensing tip at a speed set by said manually adjustable speed switch, and an electrical kill switch connected to disable said propulsion system.

9. A device for sealing seams according to claim 8 further comprising a body support secured to said body and movable relative thereto between a deployed position holding said sealant dispensing tip out of contact with said adjoining sheets of flooring and a collapsed position allowing said sealant dispensing tip to reside in contact with said adjoining sheets of flooring and said electrical kill switch is connected to disable said propulsion system unless said body support is in said collapsed position.

10. A device for sealing seams according to claim 8 wherein said seam sealing welding gun weighs no more than about 7 pounds.

11. A device for sealing seams according to claim 10 wherein said seam sealing welding gun weighs no more than about 5 pounds.

12. A device for sealing seams according to claim 9 wherein said seam follower is a thin disk mounted for rotation about said axis of roller rotation.

13. A device for discharging sealant to seal adjacent sheets of flooring together in a seam therebetween comprising:
- a handheld seam welding implement weighing no more than about 10 pounds and having an elongated body defining an axis of welding implement alignment and having a first heating end and a second, opposite power supply end,
- a sealant dispensing tip mounted on said first heating end of said body,
- a roller support structure formed as an inseparable portion of said power supply end of said body, wherein said roller support structure has mutually opposing extremities and defines a transverse axis of rotation extending between said mutually opposing extremities,
- a thin, seam following element depending from said roller support structure to fit into said seam and oriented perpendicular to said axis of rotation, and said seam following element and said axis of welding implement alignment together define a welding implement plane of operation perpendicular to said sheets of flooring when said welding implement is operated to discharge sealant into said seam,
- a pair of rollers carried by said roller support structure and said rollers are located on opposite sides of said welding implement plane of operation from said seam following element,
- an electrically powered propulsion system with an adjustable speed switch for driving said rollers in rotation to travel along said adjoining sheets of flooring in a direction away from said sealant dispensing tip, and
- an electrical kill switch to connected to disable said electrical propulsion system.

14. A device for discharging sealant according to claim 13 further comprising a body support secured to said body and movable between opposing extended and collapsed positions wherein in said extended position said body support holds said sealant dispensing tip out of contact with said adjacent sheets of flooring and in said collapsed position and said body support permits said sealant dispensing tip to reside in contact with said adjacent sheets of flooring and closes said electrical kill switch.

15. A device for discharging sealant according to claim 13 wherein said seam sealing welding implement weighs no more than about 5 pounds.

16. A device for discharging sealant for sealing seams according to claim 13 wherein said seam sealing welding implement weighs about 3 pounds, and wherein said seam follower is a thin disk mounted for rotation about said axis of rotation, and wherein said rollers are a pair of wheels, and a body support formed as a rigid leg hinged to said body for rotation about a support axis that is perpendicular to said welding implement plane of operation, and said body support is movable relative to said body between a deployed position holding said sealant dispensing tip out of contact with said adjoining sheets of flooring and a collapsed position allowing said sealant dispensing tip to reside in contact with said adjoining sheets of flooring, and said electrical kill switch is connected to disable said electrically powered propulsion system unless said leg is in said collapsed position.

\* \* \* \* \*